United States Patent [19]

Logan et al.

[11] Patent Number: 4,989,316

[45] Date of Patent: Feb. 5, 1991

[54] METHOD AND APPARATUS FOR MAKING PRESCRIPTION EYEGLASS LENSES

[75] Inventors: David J. Logan, Glastonbury; Leonard G. Rich, West Hartford, both of Conn.

[73] Assignee: Gerber Scientific Products, Inc., Manchester, Conn.

[21] Appl. No.: 23,473

[22] Filed: Mar. 9, 1987

[51] Int. Cl.⁵ .......................... B23C 3/04; B24B 13/06
[52] U.S. Cl. ................................... 29/527.3; 29/558; 51/101 LG; 409/80; 409/84
[58] Field of Search ............... 409/131, 132, 104, 122, 409/165, 166, 80, 84; 51/101 LG, 209 DL, 284 R; 82/12, 118; 29/527.3, 558

[56] References Cited

U.S. PATENT DOCUMENTS

| | | | |
|---|---|---|---|
| 1,651,181 | 11/1927 | Bugbee et al. | 51/284 |
| 2,450,433 | 10/1948 | Leeman | 51/305 |
| 2,822,647 | 2/1958 | Rips et al. | 51/133 |
| 2,994,164 | 8/1961 | Dalton | 51/111 |
| 3,065,578 | 11/1962 | Royston | 51/165 |
| 3,225,497 | 12/1965 | Brandt | 51/358 |
| 3,258,897 | 7/1966 | Edelstein | 51/124 |
| 3,348,340 | 10/1967 | Calkins et al. | 51/91 |
| 3,594,963 | 7/1971 | Beasley | 51/293 |
| 3,769,762 | 11/1973 | Mayo | 51/284 |
| 3,877,177 | 4/1975 | Taniguchi | 51/131 |
| 3,893,264 | 7/1975 | Behnke | 51/119 |
| 3,921,344 | 11/1975 | Goodwin | 51/395 |
| 3,986,433 | 10/1976 | Walsh et al. | 409/199 X |
| 4,010,583 | 3/1977 | Highberg | 51/284 |
| 4,083,272 | 4/1978 | Miller | 82/12 |
| 4,255,164 | 3/1981 | Butzke et al. | |
| 4,365,301 | 12/1982 | Arnold et al. | 82/118 X |
| 4,460,275 | 7/1984 | Spriggs | 51/284 R X |
| 4,564,914 | 1/1986 | Ballough et al. | 82/118 X |
| 4,574,527 | 3/1986 | Craxton | 51/33 W |
| 4,680,998 | 7/1987 | Council, Jr. | 82/12 X |
| 4,760,672 | 8/1988 | Darcangelo et al. | 51/284 R |
| 4,884,482 | 12/1989 | Council, Jr. | 51/165.71 X |

FOREIGN PATENT DOCUMENTS 2158648 10/1972 Fed. Rep. of Germany.
2235762  7/1974 France.
2185917  8/1987 United Kingdom.

OTHER PUBLICATIONS

D. J. Nicholas and J. E. Boon, *The Generation of High Precision Aspherical Surfaces in Glass by CNC Machining*, Journal of Physics D: Applied Physics, 14(1981), 593–600.

*Primary Examiner*—Z. R. Bilinsky
*Attorney, Agent, or Firm*—McCormick, Paulding & Huber

[57] ABSTRACT

In a method and apparatus for making a lens for a pair of prescription eyeglasses a lens blank is shaped and finished on one of its major surfaces through the use of a machine controlled by the prescription information and with a new expendable lap being made each time a new lens is wanted. A machine for cutting a lens blank and/or a lap blank is controlled in three axes by a set of point data related to and obtained in response to the input into the control system for the machine or prescription information.

51 Claims, 3 Drawing Sheets

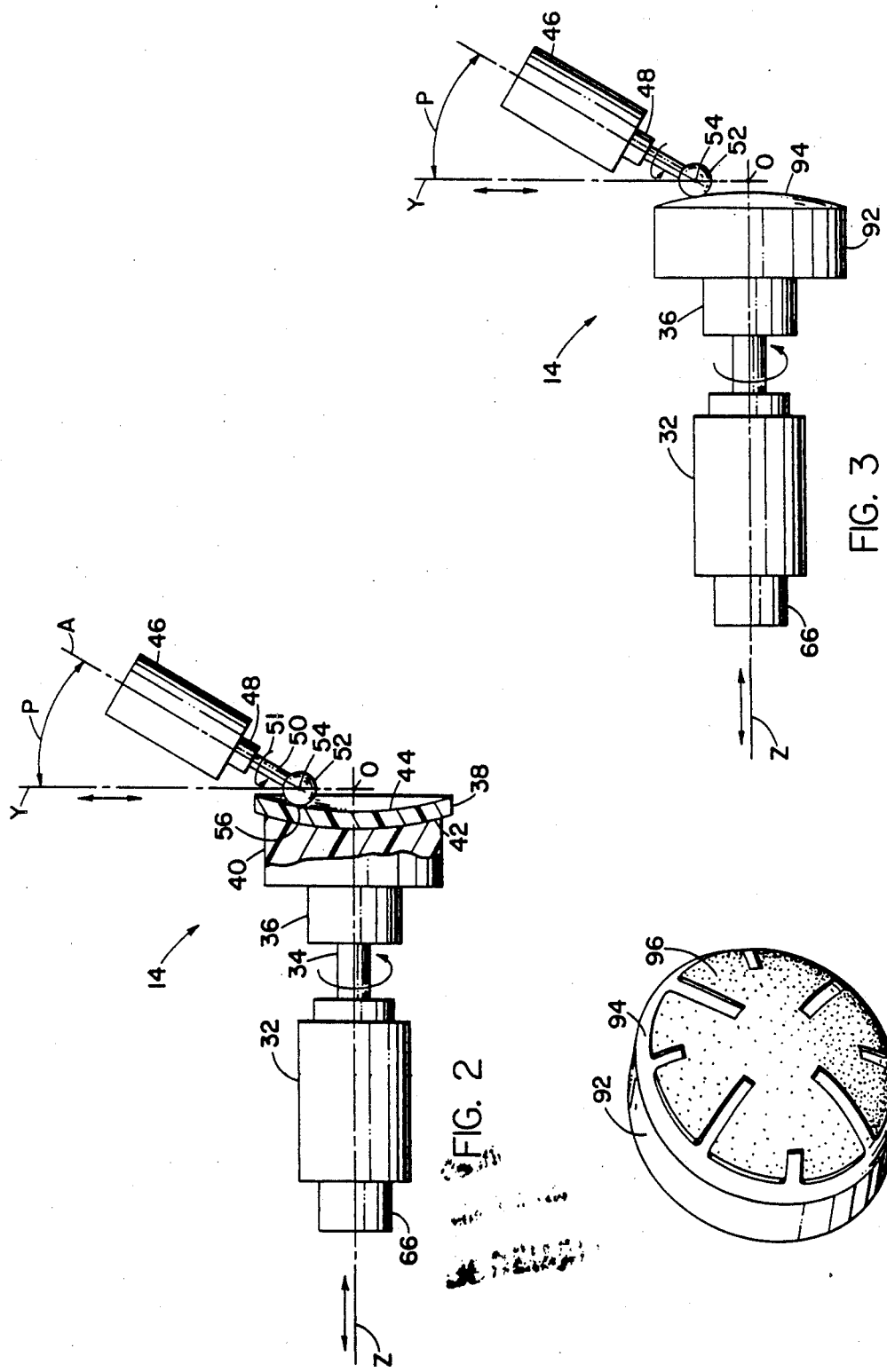
FIG. 3
FIG. 2
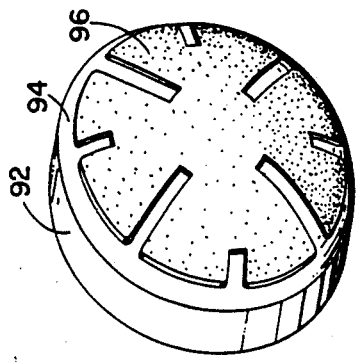
FIG. 4

METHOD AND APPARATUS FOR MAKING PRESCRIPTION EYEGLASS LENSES

BACKGROUND OF THE INVENTION

This invention relates to methods and apparatus for shaping a surface on an eyeglass lens blank to cause the blank to satisfy a given prescription, a lens thereafter being cut from the blank and fitted into a frame in combination with another such lens to provide a pair of prescription eyeglasses, and deals more particularly with such a method and apparatus wherein with the aid of a data controlled machine a new, expendable and inexpensive lap, for finishing and possibly shaping a lens surface on a lens blank, is produced each time a new lens is wanted.

A common procedure in making a lens for a pair of prescription eyeglasses is to provide a lens blank, of glass or plastic, having two major lens surfaces. One of these surfaces is then cut with a cup shaped grinding wheel to give it a shape causing the blank, except for the surface quality of the cut surface, to have characteristics fairly closely approximating those of the prescribed lens. The cut surface is then further shaped through the use of a lap to cause the blank to still more closely approach the prescribed characteristics. After the worked lens surface is brought to the proper shape it is then brought to a polished condition using the same lap as used for the shaping. In some instances some of the refining of the surface quality may occur simultaneously with the shaping.

A typical machine for shaping and polishing a lens surface through the use of a lap, as described above, is shown, for example, by U.S. Pat. No. 3,893,264.

In the above described known procedure the lap surface determines the final shape of the worked surface of the lens blank. To be able to produce a lens blank satisfying any randomly given reasonable prescription it is necessary for the optical laboratory, or other lens-making facility, to have available an extremely large inventory of relatively expensive differently shaped reusable laps so that when presented with a given prescription a lap having the proper shape will be at hand for use. Even so, it is often impossible to provide a lap perfectly suiting each possible prescription and in making a lens it thus often becomes necessary to use a lap having a not quite perfect shape. Or, as a corollary to this the characteristics given in a prescription can be specified only in steps the fineness of which is determined by the extent of the lap inventory.

An eyeglass prescription at the present time commonly specifies, for each lens, values of "sphere", "cylinder" and "prism". When cylinder is specified for a given lens the worked surface of the lens blank in its finished state should be toric in shape. One reason for relying on a lap to control the end shape of the worked surface is that so-called "toric generators" commonly used to cut the worked surface, and which use cup shaped cutting wheels, fail to cut truely toric surfaces and include in the cut surface an "elliptical" error subsequently removed by the lap. That is, the lap removes a non-uniform thickness layer of material from the worked surface to bring that surface to, or at least closer to, the desired toric shape.

Furthermore, at the present time prescription eyeglass lens-making procedures and apparatus are substantially limited to producing lens surfaces the complexity of which do not exceed that of a toric surface. It is likely, however, that if a means were available to produce lens surfaces of more complex shape lenses with such surfaces might better suit the individual requirements of some eyes and might be prescribed in the future.

The above discussion applies both to single vision lenses and multifocal lenses. However, in comparison to the production of a single vision lens, the making of a multifocal lens requires the stocking of a large inventory of lens blanks having differently powered and differently configured multifocal segments so that a blank with the proper multifocal segment to fill a given prescription can be selected from the inventory. Each multifocal lens blank has a multifocal segment formed on one of its major surfaces and in producing a lens from the blank in accordance with present practice, the opposite major surface of the blank is worked to give the blank characteristics satisfying the prescription.

The general object of the invention is to provide a method and apparatus for making a prescription eyeglass lens from a lens blank, by shaping and finishing one surface of the blank, which permit a lens to be made more economically then by presently known procedures.

In keeping with the forgoing object, a more specific object of the invention is to provide a lens making apparatus and method wherein the need for a lens maker to maintain a large and costly inventory of shape defining laps is avoided, thereby reducing the capital required for setting up a lens making facility and avoiding the trouble and expense involved in selecting, removing and returning laps from and to their storage locations.

A further object of the invention is to provide a method and apparatus for making a prescription lens whereby the characteristics given by the prescription may be specified to a finer degree, and the lens be made to meet such finer specifications, than is presently generally the case.

Another object of the invention is to provide a lens making apparatus and method whereby shapes more complex then that of a toric surface, if desired, may be given to a lens surface to more closely match the resulting lens to an individual eye. Allied with this object is that of being able to cut a lens blank to include prism, if desired, in the finished lens without having to decenter or otherwise adjust the lens blank in the cutting or finishing machines as is currently usually necessary. That is, a feature of the invention is that most or all desired surface shapes, including those with prism, can be obtained with a standard uniform mounting of each lens blank in the involved machines.

Another object of the invention is to provide a lens making apparatus and method of the forgoing character wherein a single cutting tool may be used to cut lens surfaces of a wide range of curvature, thereby avoiding the necessity inherent in many present machines of having to use differently sized cutters for cutting surfaces with different degrees of curvature.

Another object of the invention is to provide an apparatus and method of the forgoing character which permit the cutting and finishing of a lens surface including a multifocal segment, thereby permitting a multifocal lens to be produced from a lens blank having initially two plain spherical or other nonsegmented surfaces.

Other objects and advantages of the invention will be apparent from the following description of preferred embodiments of the invention taken in conjunction with the accompanying drawings.

SUMMARY OF THE INVENTION

The invention resides in an apparatus and method for making a prescription eyeglass lens from a lens blank wherein one of the two preformed major surfaces of the blank is cut and finished to cause the blank to satisfy a prescription and wherein the shape of the worked surface is defined by using the prescription information itself to control the operation of a data controlled cutting machine which cuts a surface of the desired shape either directly onto the lens blank or onto a lap blank or onto both a lens blank and a lap blank.

The invention also resides in a three-axis cutting machine using a spherical cutting tool for cutting a surface such as aforesaid on a lens blank and/or on a lap blank under the control of prescription related input data.

BRIEF DESCRIPTION OF THE DRAWINGS

FIG. 2 is a plan view of a portion of the machine of FIG. 1 with part of the lens blank and the lens blank holding block being shown broken away to better reveal the cutting tool.

FIG. 3 is a view generally similar to FIG. 3 but showing the illustrated apparatus being used for cutting a lap blank rather than a lens blank.

FIG. 4 is a perspective view showing the finished lap blank of FIG. 3 fitted with an abrasive pad.

DESCRIPTION OF THE PREFERRED EMBODIMENTS

The invention embraces a number of specific methods a common feature of which is the generation of a new lap each time a new lens is wanted with the lap having a surface shape dictated by the prescription information given for the lens. This lap surface may, depending on the involved method, be formed directly on a lap blank or may be formed by first producing a prescription related surface on a lens blank and then using that lens blank surface to define the lap surface. In other methods a prescription related surface may be formed directly on both a lap blank and a lens blank. In all methods the lap is then used to at least polish the worked surface of the lens blank.

Figure 1:
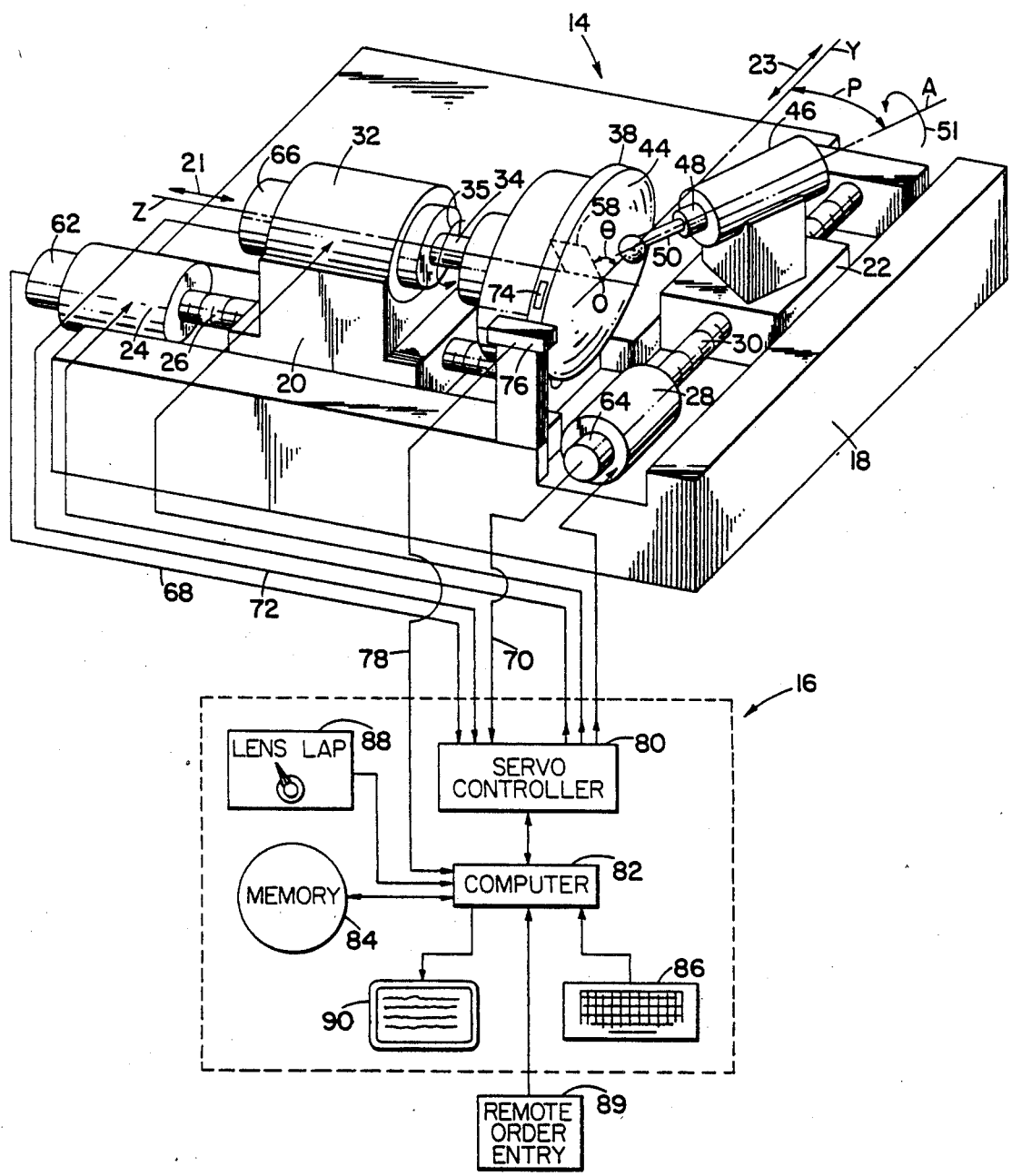
FIG. 1 is a view showing a three-axis cutting machine and associated control system embodying the invention for cutting a prescription related surface on a lens blank or a lap blank, the machine being shown somewhat schematically and the control system being shown in block diagram form, and the machine being shown in the process of cutting a lens blank.

Referring to FIG. 1, this figure shows a three-axis cutting machine 14 and related control system 16, embodying other aspects of the invention, which may be used to generate a prescription related surface on either a lens blank or a lap blank. The actual appearance of the machine 14 may vary widely, and in FIG. 1 the machine is shown somewhat schematically to illustrate principally its basic components and their interrelationships.

The cutting machine 14 includes a base 18, a first slide 20 and a second slide 22. The first slide 20 is supported and guided by the base 18 for translational movement relative to the base parallel to the illustrated Z axis as indicated by the arrow 21, and the slide 22 is supported and guided by the base for translational movement parallel to the illustrated Y axis as indicated by the arrow 23. The Y and Z axes are perpendicular to one another and intersect at the point or origin 0. The slide 20 is driven parallel to the Z axis by an associated servo-motor 24 and lead screw 26, while the slide 22 is similarly driven parallel to the Y axis by an associated servo-motor 28 and lead screw 30.

Referring to both FIGS. 1 and 2, the slide 20 of the cutting machine 14 supports a third servo-motor 32 having an output shaft 34 collinear with the Z axis. The motor 32 drives the shaft 34 about the Z axis as indicated by the arrow 35. Attached to the shaft 34 is a chuck 36 for releasably securing a lens blank or a lap blank to the shaft 34 during the cutting process performed by the machine. In FIGS. 1 and 2 a lens blank 38 is shown attached to the chuck 36 with such attachment being obtained through the intermediary of a block 40. The lens blank 38 initially has two major surfaces 42 and 44 both of which are usually spherical. In the illustrated case the surface 44 is cut and finished to give it a changed shape causing the blank to satisfy a given prescription. The unworked surface 42 of the blank is releasably bonded to the block 40 by any suitable known bonding technique customarily used for blocking purposes.

The eyeglass blank 38 may be made of glass or plastic, but in FIG. 2 is taken to be and is shown as plastic. The block 40 may be made of various different materials but preferably is made of plastic and is shown as such in FIG. 2.

The slide 22 carries a rotary cutter comprised of a drive motor 46, a chuck 48 and a cutting tool 50. The cutting tool has a spherical cutting surface 52 with a center of curvature 54 positioned on the Y axis. Because of the spherical shape of the cutting surface 52 the tool engages the desired surface to be cut on the blank at essentially a single point 56. The motor 46 is fairly high powered, for example of one horsepower or more, and rotates the tool 50 at a relatively high speed, for example 20,000 rpm or more, as indicated by the arrow 51, about an axis A passing through the center of curvature 54. Although not essential to the broader aspects of the invention, the axis A preferably and as illustrated in FIGS. 1 and 2 is located in the plane containing the Y and Z axes and is inclined from the Y axis by an angle P which is chosen in conjunction with the diameter of the spherical cutting surface 52 so that the tool, without replacement, can cut a wide range of different curvatures on the blank 38 without the shank of the tool interfering with the blank.

The exact nature of the cutting tool 50 may vary. For example, it may be a ball mill type cutting tool made entirely of metal and having a plurality of sharp cutting edges defining the spherical surface 52, or it may be an abrasive type tool such as one comprised of a metallic body having abrasive particles bonded to the body and defining the spherical cutting surface 52. Generally speaking, it will be selected to be the type best suited to cut the particular material of which the involved lens or lap blank is made. In any event, the diameter of the spherical cutting surface 52 is preferably within the range of 0.5 to 1.0 inch.

The machine 14 as illustrated and described above is referred to as three-axis machine since it provides for the controlled positioning of the cutting tool 50 in three coordinate axes relative to the blank mounted in the machine, thereby enabling the tool to generate or cut any reasonably shaped three dimensional surface on the blank. That is, any point on the desired surface can be defined in terms of three coordinates of a three-axis coordinate system fixed relative to the mounted blank, and these three surface point coordinates can be transformed into three tool point coordinates of the illustrated three coordinate system of FIG. 1 defining the related point which must be assumed by the center 54 of the tool to cause the cutting surface of the tool to engage and cut the blank at the lens surface point 56 in question. This transformation of axes takes into account the displacement between the center point 54 and cutting point 56 of the tool and is dependent on both the diameter of the tool and the curvature of the desired surface at the cutting point 56.

The three tool point coordinates of any given tool point are reproducible by the machine 14. One of these coordinates is a y coordinate measured parallel to the Y axis and is the displacement in that direction of the tool point in question from the origin 0 of the Y and Z axes. Another coordinate is a z coordinate measured parallel the Z axis and is the displacement in that direction of the tool point in question from the origin 0. The third coordinate is an angular coordinate $\theta$ measured about the Z axis and is the angular displacement of the tool point in question from a reference plane 58 fixed relative to the blank 38 and containing the Z axis. It will also be understood that the surface cut on the mounted blank in response to the tool point data may be of any reasonable shape as required by the prescription and may indeed be a toric shape or even a more complex shape wherein the intersections of the surface with planes perpendicular to the Z axis are noncircular.

An eyeglass prescription, for each lens of a pair of eyeglasses, defines characteristics wanted in the finished lens. Given the particular material of which the lens blank is made (which determines its index of refraction) and the curvature of the surface 42 which is to be left unworked, the prescribed characteristics dictate the shape needed to be given to the worked blank surface 44 in order for the lens blank to satisfy the prescribed characteristics. Thus, given a prescription for a lens, as stated for example in terms of "sphere", "cylinder", and "prism" values (or perhaps different and/or additional values), and given information as to the index of refraction and curvature of the unworked lens blank surface, the prescription information can be converted to a set of surface point data consisting of three coordinates for each of a large number of points located on and distributed over the desired surface, and therefore defining that surface. Once the surface point data defining the desired surface is at hand and also knowing the diameter of the spherical cutting surface 52 of the tool 50, the set of surface point data can be converted or transformed into a related set of tool point data consisting of three coordinates (y, z, and $\theta$) for each of an identical large number of tool points which will result in the cutting of the desired surface on the lens blank if the center 54 of the tool 50 is moved one point at a time to such tool points. It therefore follows that the coordinate information defining the tool points can be used to control the machine 14 to cut a surface of the desired shape on the mounted blank.

Figure 6:
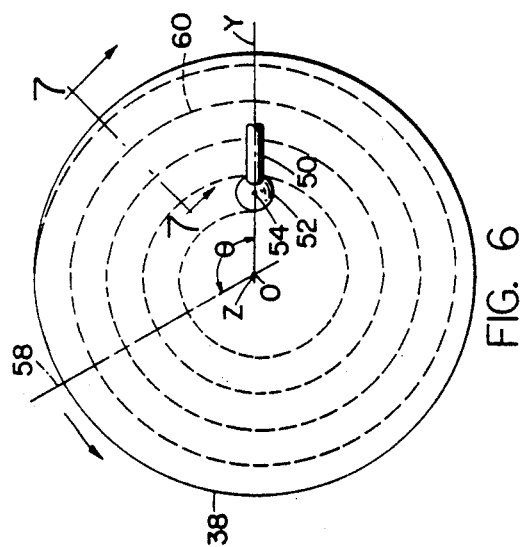
FIG. 6 is an elevational view taken looking toward the lens blank of FIG. 1 and shows the spiral path of movement of the cutting tool, the pitch of the spiral path being exaggerated for purposes of illustration.

Further, the tool points of the tool point data set, in accordance with another aspect of the invention, are arranged so as to fall in sequence along a given two dimensional tool path such as, for example and as illustrated in FIG. 6, a spiral path 60 in a tool path plane perpendicular to the Z axis. In the actual cutting operation of the machine 14 the tool is moved continuously and simultaneously in the two coordinate directions (y and $\theta$) of the two dimensional tool path so as to move along such tool path; and during such movement adjustments, as needed, are made in the third (z) coordinate direction so that as the tool center 52 reaches the two coordinates (y, $\theta$) of a tool point in the tool path plane the third coordinate (z) of that point is also achieved at the same time by the tool center.

Therefore, in the operation of the machine 14 in accordance with the invention a first step is to convert the information given by a lens prescription into a set of point data which can be used to control the machine and which will cause the machine to cut on the involved blank a surface of the desired shape. Such conversion of the prescription information to point data may be carried out using any one of a number of different algorithms, is well within the competence of a person skilled in the art, and is therefore not described here in detail. It should be noted, however, that in a method wherein both a lens blank and a lap blank for use in making the same lens are machined by the machine 14 the point data used for cutting the lens blank will be the same as used for cutting the lap blank except for being reversed so that the surface generated on one blank will be the complement of the surface cut on the other blank, and also except possibly for the introduction of an allowance to accommodate the thickness of a finishing pad to be attached to the surface of the lap blank as described hereinafter. This means that after the prescription information is converted into point data for use in controlling the machine to generate a surface on a lens blank, for example, the point data needed to control the machine to generate a lap blank surface can be easily obtained by a simple reversal of the point data used for generating the lens surface and by possibly introducing a simple correction for the thickness of a finishing pad.

To allow for its control in the positioning of the tool 50 the machine 14 includes encoders for each of its three positioning axes to provide information to the control system 16 as to the actual instantaneous position of the tool center point 54. These encoders are indicated respectively at 62, 64, and 66 in FIG. 1, are associated respectively with the servo-motors 24, 28 and 32 and are connected to the control system 16 through lines 68, 70 and 72. The lines 68, 70 and 72 therefore supply the control system 16 with signals representing respectively the z, y and $\theta$ coordinates of the actual instantaneous position of the tool center point 54 in the illustrated coordinate system.

In cases where the machine 14 is used to machine both lens blanks and lap blanks some means is preferably provided to enable the machine to supply to the control system 16 a signal indicating the type of blank mounted in the machine. In accordance with one aspect of the invention such a means includes the provision of a distinguishing feature on the blanks of one type which is lacking on the blanks of the other type, and of a sensor on the machine for sensing the presence or absence of such feature on the mounted blank. By way of example, in FIG. 1 the lens blank 38 is shown to include a small tab 74 of magnetic material attached to or inset in its rim and the machine 14 includes a sensor 76 which detects the presence of the tab 74 as the blank 38 is rotated about the Z axis. In line with this implementation, all lens blanks to be used with the machine include a tab such as the one illustrated at 74 and all lap blanks to be used with the machine lack such a tab. When a new blank is mounted in the machine 14 and the motor 32 first turned on to rotate the blank about the Z axis the signal produced by the sensor 76, and transmitted to the control system 16 over the line 78, will indicate to the control system whether the mounted blank is a lens blank or a lap blank.

The control system 16 for the machine 14 may vary widely as to its details, but basically and as shown in FIG. 1 it is comprised of a servo controller 80 (which may itself contain a microprocessor), a computer 82 and a computer memory 84. A means is also included for entering prescription information and other data which may be needed to allow the conversion of the prescription information to point data dictating generation of the proper surface on the involved blank. The exact nature of the data input means may also vary without departing from the invention, but in a typical case, and as shown in FIG. 1, it is either a local order entry means, such as a keyboard 86 and a mode selection switch 88, or a remote order entry system, computer or data link comprising a remote order entry means 89. The selection switch 88 may be manually set to either a lens surface generation mode or to a lap surface generation mode according to whether the intention of the operator is to machine a lens blank or a lap blank. The structure and function of the selection switch 88 may be readily replaced by a key of the keyboard 86, by an entry routine using the keyboard 86 or by instructions from the remote order entry means 89, but it is shown separately in FIG. 1 for purposes of clarity. A readout means, such as a CRT display device 90 or the like, may also be included in the system to allow the computer to supply instuction and information to the operator.

In general the control system 16 of FIG. 1 functions as follows. Prescription information describing the characteristics of the lens to be generated is input to the computer 82 using the keyboard 86 or the remote order entry means 89. At the same time the operator or the remote entry means 89 also may enter additional data which may be needed to result in a lens of described surface shape and other characteristics. Such additional information may be the index of refraction of the blank material and the spherical curvature of its unworked surface 42. As an alternative, the system 16 may be set up so that after entry of only the prescription information the computer will process this information and supply a readout on the display device 90 describing to the operator the characteristics of the blank to be mounted onto the machine. As another alternative, if the machine 14 is to be used with only blanks of a standard uniform character it may not be necessary to enter any data describing the blank nor to instruct the operator as to the selection of the blank.

If the machine 14 is to be used for cutting both lens blanks and lap blanks at some point before the actual cutting process begins the operator checks and adjusts, if necessary, the mode selection switch 88 to make certain it is set to agree with the type of blank intended. If set to the lens mode the tool point data fed by the computer to the servo controller is such as to cause the cutting of a surface on the blank mounted in the machine of a lens surface conforming to the input prescription information, and if the switch is set to the lap mode the tool point data fed by the computer to the servo controller is such as to cause the cutting on the blank mounted in the machine of a lap surface conforming to the input prescription information. As mentioned, the computer 82 receives from the sensor 76 signals indicating the type of blank mounted in the machine. These signals may be used to inhibit a cutting operation of the machine if when the mounted blank is first set into rotation the type of blank indicated by the sensor signals does not agree with the setting of the switch. That is, before a cutting operation begins the tool 50 is positioned radially outwardly beyond the outer edge of the mounted blank. Then when the machine is started the comparison of the sensor 76 output with the switch 88 setting is made immediately and the movement of the tool along the Y axis is inhibited before the tool reaches cutting engagement with the blank, in the event the comparison is unfavorable.

In an alternate way of using the sensor 76 the switch 88 is eliminated and the output of the sensor is used to control the type of surface cut by the machine. If the sensor detects the mounted blank as being a lens blank the computer is conditioned to supply tool point data to the servo controller causing the cutting of a lens surface, and if the mounted blank is detected to be a lap blank the computer is set to supply tool point data to the servo controller causing the cutting of a lap surface.

Figure 7:
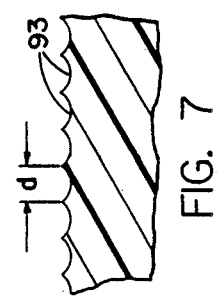
FIG. 7 is an enlarged fragmentary sectional view taken on the line 7—7 of FIG. 6.

The computer 82 then, with the aid of programs and information stored in the memory 84, converts the input prescription information to a set of tool point data describing the position of the center point 54 of the tool at points located along a spiral tool path in the plane of the Y and $\theta$ axes, as shown in FIG. 6. The servo contoller is then supplied with commands from the computer 82 causing the servo-motors 28 and 32 to operate continuously and at such coordinated rates as to cause the tool center point 54 to follow the spiral tool path 60 in the Y, $\theta$ plane. As mentioned, the commands are such that the cutting surface of the tool is initially located radially outwardly beyond the edge of the blank and is then moved continuously inwardly along the Y axis toward the origin 0. For at least the major portion of the movement of the tool from the outer edge of the blank to the origin 0 along the Y axis the Y axis and $\theta$ axis movements are perferably coordinated so that the "pick" cut by the tool on the blank will have a constant value. The tool in moving along the tool path because of the spherical shape of its cutting surface actually cuts a shallow spiral groove 93 in the blank. As shown in FIG. 7, the "pick" is the spacing d between the crests of adjacent convolutions of the groove 93. The pick d taken in conjunction with the diameter of the tool cutting surface is therefore a measure of the quality of the surface cut on the blank by the tool. Preferably the rates of movement in the Y and $\theta$ axes are coordinated so that the pick in the generated surface has a value of less then 0.030 inches, which means that the tool is moved along the Y axis at a rate of less then 0.030 inches per revolution of the blank about the Z axis.

The movements of the tool 50 in the Y and $\theta$ axes are also preferably further coordinated so that at least along the major portion of the tool's radial movement from the outer edge of the blank to the origin 0, the blank has a substantially constant tangential velocity relative to the tool. This tangential velocity is preferably on the order of at least 200 inches per minute and more desirable is more than 300 inches per minute. The coordination of the movements is perferably such that the tool 50 is moved along the Y axis at a constant rate and the speed of rotation of the blank about the Z axis is varied as necessary to keep the tangential velocity of the blank relative to the tool at the desired constant value. The above mentioned coordination of the Y and $\theta$ axis movements perferably holds throughout the movement of the tool from the outer edge of the blank to a point near the origin 0. However, as the tool nears the origin 0, say gets to within the last half inch adjacent the origin 0, both the speed of the tool along the Y axis and the speed of rotation of the blank about the Z axis may be reduced to bring the cutting process to a gradual end.

As the tool 50 is moved along the spiral tool path 60 by the coordinated continuous operation of the Y and $\theta$ motors 28 and 32 the center point 54 of the tool is moved in succession to the tool points defined by the tool point data in the Y, $\theta$ plane and as this movement in the Y, $\theta$ plane takes place the Z axis servomotor 32 adjusts the position of the blank 38 along the Z axis so that when the y, $\theta$ coordinates of a given tool point are reached by the tool center the z coordinate of that point is also achieved by the tool center at the same time.

The conversion of the prescription information to a set of tool point data may be handled in various different ways depending largely on the power and capacity of the computer 82 and memory 84. In one case the conversion may be made by storing in the memory 84 a data base containing a multitude of individually selectable blocks of data each of which blocks of data contains point data defining, either directly or with slight modification, a surface corresponding to a specific set of identifying prescription information. In another words, for each acceptable combination of prescription values the memory contains an associated block of point data, and when a given prescription is input into the computer the corresponding block of point data identified by that prescription is withdrawn from the memory and used by the computer 82 and servo controller 80 to control the machine 14.

As an alternative to the foregoing, the memory 84 may be used to store a multitude of individually selectable blocks of data each of which blocks of data includes a plurality of control points located on a surface corresponding to a set of prescription information identifing such block of data, the control points further being located along a two dimensional tool path in the Y, $\theta$ plane, such as along the spiral tool path 60 described above. When a given prescription is input to the computer the associated data block is retrieved from the memory. The control points of this data block are then used by the computer to generate the coordinates of additional data points falling between the control points. The point data so generated is then used by the computer and the servo controller to control the operation of the machine 14.

In yet another method of converting the input prescription information to point data the memory 84 does not store any blocks of point data or any blocks of control points but instead stores merely programs and further information with the help of which the computer 82 is able to originate a set of point data for controlling the machine 14 to generate the desired surface each time a new prescription is entered into the control system. This conversion is performed at sufficient speed as to allow the actual cutting operation of the machine 14 to begin as soon as or shortly after the prescription information is entered and to allow the machining to take place at a reasonably fast rate.

Regardless of the method used to convert the input prescription information to machine controlling point data, it is preferred that the control system 16 and the machine 14 be capable of operating at such speeds that following the entry of the prescription information the cutting of a blank will take place in less than one minute.

The machine 14, as described above, is used in the practice of the invention to provide a surface on a lens blank and/or on a lap blank having a shape accurately corresponding to a given randomly selected prescription. In further accordance with the invention a number of different methods making use of such an accurate surface, freshly generated each time a new lens is wanted, may be employed to arrive at a lens blank having characteristics satisfying the given prescription.

One method for using the machine 14 and control system 16 of FIG. 1 to produce a lens blank satisfying a randomly selected prescription is illustrated by FIG. 2, 3, 4 and 5. In this method the machine 14 is first used as shown in FIG. 2 to machine a surface 44 on a lens blank 38 to give the surface 44 a shape causing the lens blank 38 to have characteristics satisfying the prescription except for the surface quality of the machined surface 44. That is, immediately after its machining the surface 44 has a so-called "gray" surface quality and has to be further finished to bring it to a polished quality.

In the next step of the process the lens blank 38 is replaced in the machine 14 by a lap blank 92, preferably made of plastic, and the machine is used to cut a lap surface 94 on the lap blank 92 having a shape also accurately dictated by the input prescription information. The lap surface 94 is later used to finish the lens blank surface 44. If in this finishing procedure the lap surface 94 directly engages the lens surface 44 the lap surface 94 may be exactly the reverse or complement of the lens surface 44. If a finishing pad is to be attached to the lap surface in the finishing process the surface 94 created on the lap may be the reverse or complement of the lens surface 44 except for being compensated to allow for the thickness of the finishing pad. In either event, however, it will be understood that having obtained the point data needed to control the machine 14 to cut the lens surface 44 the same point data with only minor change may also be used to cut the lap surface 94.

After the lens blank 38 and the lap blank 92 have been cut to form thereon the gray lens surface 44 and the lap surface 94 the lap may be used to finish the gray surface 44 on the lens blank to bring it to a polished state without changing its basic shape. Preferably this is done, as shown in FIG. 4, by first adhesively attaching to the surface 94 of the lap blank 92 an abrasive pad 96 of standard well known construction. The degree of finishing required depends on the roughness of the gray lens blank surface 44. In some instances the quality of this surface after generation may be sufficiently fine that only a polishing step is required to bring it to a polished state. In this event the pad initially attached to the lap 92 may be a polishing pad containing a very fine polishing abrasive. However, to produce with the machine 14 a gray lens surface 44 of sufficiently fine surface quality that only a following polishing step is required usually means that a relatively long time need be devoted to the cutting of the surface 44. Because of this a more acceptable overall time for the production of a finished lens may usually be obtained by running the machine 14 under such conditions that the gray surface 44 cut on the lens blank has a degree of roughness requiring a prepolishing step in advance of the polishing step, in which prepolishing a coarser abrasive is used than in polishing. Therefore in such a case the pad 96 first attached to the lap 92 is a prepolishing pad, and after the prepolishing step this pad is removed and replaced by a polishing pad.

Figure 5:
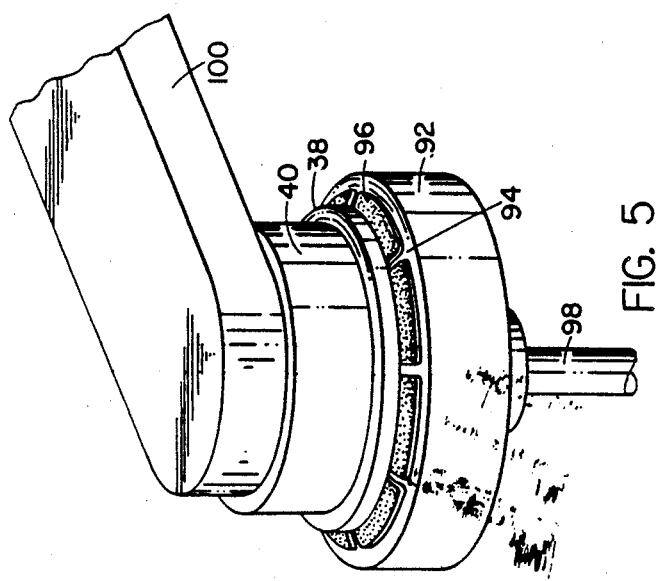
FIG. 5 is a perspective view showing the lap blank of FIGS. 3 and 4 being used in a finishing machine to finish the worked surface of the lens blank of FIG. 2.

After a pad 96 has been applied to the lap surface 94 the lap 92 and the lens blank 38, along with its block 40, are mounted, as shown in FIG. 5, respectively to the two arms 98 and 100 of a lapping machine which may be any one of a number of standard machines such as, for example, the one shown by the aforementioned patent 3,893,246. This lapping procedure does not change the basic shape of the lens surface 44 and gradually brings that surface to a polished state. Thus, after the polished state is achieved the lens blank will have the characteristics needed to statisfy the associated prescription and may be cut and edged in a conventional way to provide a lens for insertion into an eyeglass frame.

In another method according to the invention the machine 14 and related control system 16 are used only, as represented by FIG. 3, to cut a lap surface 94 on a lap blank 92 each time a new lens is wanted. The lap so produced is then used in substantially the same way as laps have been used in the past to shape, refine and polish a surface on a lens blank—with the exception that after the shaping, refining and polishing steps are completed the lap is discarded and not saved for further use. More specifically, after the lap surface is generated in response to a randomly given set of prescription information it is matched with a lens blank having a lens surface to be worked. The lap and lens blank are then placed in a lapping machine and in a first rough grinding step a coarse abrasive pad is attached to the lap surface so that in the lapping process the lap shapes the lens surface to take on a shape reversed to that of the lap. In subsequent fining and polishing stages the worked lens surface is further refined, and possibly shaped, until brought to a final polished state with a shape conforming to that of the lap surface 94.

Figure 8:
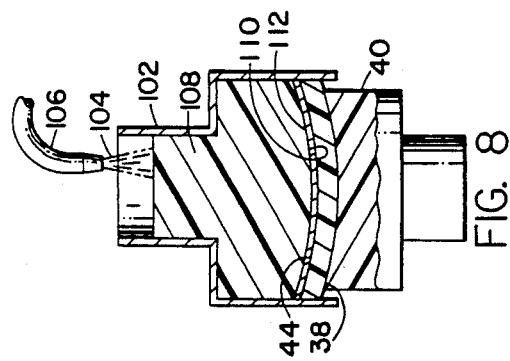
FIG. 8 is a view, partly elevational, and partly in section, showing an alternative method embodying the invention for making a lap.

In another method embodying the invention, the machine 14 and control system 16 may be used to provide on a lens blank an accurately shaped lens surface conforming to a given set of input prescription information. This accurate lens surface is then used to define a corresponding lap surface on a lap blank, and then the lap blank and lens blank are placed in a lapping machine and the lap used to bring the lens surface to a polished state without changing its shape. In this method various different schemes may be used for defining a surface on the lap blank conforming to the machined surface on the lens blank. One of such methods is illustrated in FIG. 8 and involves the use of the machined surface 44 of the lens blank as a mold surface in the formation of a molded lap. Referring to this figure, after the surface 44 is cut on the lens blank 38 the lens blank and the block 40 are oriented as shown so that the cut lens surface 44 faces generally upwardly. A hollow thin-walled mold structure 102 is then slipped over the edge of the lens blank 38 to the position illustrated and a liquid setable molding material 104 is then poured into the mold so formed, as by means of a nozzle 106, until the mold is filled to substantially the illustrated level. The material 104 may, for example, be a thermoplastic material heated to a liquid state prior to being introduced to the mold and which solidifies when cooled to room temperature. After the material does cool the result will be a rigid lap 108 having a lap surface 110 complementing the lens surface 44. If the lap 108 is to be used with an abrasive pad in the lapping process the lens blank 38 preferably has its surface 44 covered with a layer of sheet material 112, prior to the application of the mold structure 102, which sheet material 112 has a thickness equivalent to the thickness of the abrasive pad to be used with the lap. In this case the sheet material 112 is treated on both sides with release agents so that after the molding process it may be removed from both the lap 108 and the lens blank 38. In a slightly alternate procedure the sheet material 112 may itself be of an abrasive nature and designed so that in the molding step it becomes bonded to the lap 108 and thereby forms an abrasive surface on the lap 108 eliminating the need for a supplemental pad such as the pad 96 shown in FIG. 4.

In another method wherein a surface machined on a lens blank is used to define a lap surface, after the lens blank is machined to produce on it an accurately shaped gray surface an abrasive pad, such as the pad 96 of FIG. 4, is attached to the gray surface. The lens blank and an unshaped lap blank are then put into a lapping machine and moved relative to one another to cause the lens blank and its attached pad to abrade the lap blank and generate on the lap blank a lap surface complementing the lens blank gray surface, except for the pad thickness. The pad is then removed from the lens blank and a pad of similar thickness is attached to the lap surface. Then the lap and the lens blank are again placed in a lapping machine and removed relative to one another to refine and polish the gray lens blank surface to a finished condition. Of course both the abrading of the lap blank and the refining of the lens blank surface may be carried out, if necessary, in more than one stage with a change of pads between stages.

We claim:

1. A machine for machining a blank to produce a surface thereon related to a given eyeglass prescription, said machine comprising:
   (a) a blank holder,
   (b) a rotary tool for cutting a blank held by said holder and having an axis of tool rotation,
   (c) means for driving said tool about said axis of tool rotation,
   (d) $\theta$ coordinate drive means for continuously moving said tool and said holder, and any blank attached to said holder, relative to one another in a $\theta$ coordinate direction about a Z axis,
   (e) Y coordinate drive means for continuously moving said tool and said holder, and any blank attached to said holder, relative to one another in a y coordinate direction along a Y axis intersecting said Z axis,
   (f) Z coordinate drive means for moving said tool and said holder, and any blank attached to said holder relative to one another in a z coordinate direction along said Z axis, and
   (g) control means for controlling said Z coordinate drive means in response to data corresponding to a given eyeglass prescription and in response to the instantaneous $\theta$ coordinate position of said holder relative to said tool about said Z coordinate axis and the instantaneous y coordinate position of said holder relative to said tool along said Y coordinate axis so that said tool cuts a surface related to said prescription on any blank attached to said holder.

2. A machine for machining a blank as defined in claim 1 further characterized by said tool having a spherical cutting surface, and said axis about which said tool is rotated passing through the center of curvature of said spherical cutting surface.

3. A machine for machining a blank as defined in claim 2 further characterized by said tool being a mill type cutter having a plurality of cutting edges defining said spherical cutting surface.

4. A machine for machining a blank as defined in claim 2 further characterized by said tool being an abrasive type tool having abrasive particles bonded to a body and defining said spherical cutting surface.

5. A machine for machining a blank as defined in claim 1 further characterized by said control means being capable of contolling said Z coordinate drive means such that the surface cut by said tool on said blank, when called for by said prescription, is one such that the intersections of the surface with planes perpendicular to said Z axis are noncircular.

6. A machine for machining a blank as defined in claim 1 further characterized by said surface cut by said tool on the blank held by said holder being a lap.. surface usable to finish on a lens blank a lens surface giving said lens blank characteristics satisfying said prescription.

7. A machine for machining a blank as defined in claim 6 further characterized by said lap surface being the reverse of said lens surface except for being compensated for the thickness of a finishing pad to be attached to said lap surface.

8. A machine for machining a blank as defined in claim 1 further characterized by said surface cut by said tool on the blank held by said holder being a lens surface on a lens blank giving said lens blank shape characteristics satisfying said prescription.

9. A machine for machining a blank as defined in claim 1 further characterized by said control means also being operable to control said $\theta$ coordinate drive means and said Y coordinate drive means in relation to one another so that, throughout a major portion of the travel of said tool along said Y axis and in cutting engagement with said blank, said blank moves at a substantially constant tangential velocity relative to said tool and said tool moves along said Y axis by a substantially constant distance for each revolution of said blank relative to said tool.

10. A machine for machining a blank as defined in claim 9 further characterized by said 0 coordinate drive means being operable to rotate said blank about said Z axis so as to have a tangential velocity relative to said tool of at least two hundred inches per minute during the travel of said tool along said major portion of said Y axis, and said Y coordinate drive means being contolled by said control means to move along said Y axis at a rate of less than 0.030 inches per revolution of said blank about said $\theta$ axis as said tool travels along said major portion of said Y axis.

11. A machine for machining a blank as defined in claim 1 further characterized by said control means being selectively operable to control said Z coordinate drive means in either a lap cutting mode in which said tool is caused to cut a lap surface on the blank held by said holder or in a lens cutting mode in which said tool is caused to cut a lens surface on the blank held by said holder, said lap surface and said lens surface for a given eyeglass prescription being the reverse of one another except for said lap surface being compensated for the thickness of a finishing pad, if any, which may be attached to it in a subsequent procedure for finishing said lens surface.

12. A machine for machining a blank as defined in claim 11 and for use with either lap blanks or lens blanks and wherein all of the blanks included in one of said categories of blanks each include a feature distinguishing it from the blanks of the other category, detector means for sensing a blank mounted on said blank holder to detect the presence or absence of said feature on said mounted blank, and means responsive to said detector means for causing said control means to control said Z coordinate drive means in said lens cutting mode only when a lens blank is attached to said holder and to cause said control means to control said Z coordinate drive means in said lap surface cutting mode only when a lap blank is attached to said holder.

13. A machine for machining a blank as defined in claim 11 and for use with either lap blanks supplied from a set of lap blanks or with lens blanks supplied from a set of lens blanks, each of the blanks making up one of said two sets of blanks having a central axis which becomes aligned with said Z axis when said blank is held by said holder and a side surface which is at least substantially a surface of revolution about said central axis and also having means providing an anomaly in said side surface at one point along a line extending circumferentially of said blank about said central axis, the blanks of the other of said two sets of blanks each having a central axis which becomes aligned with said Z axis when said blank is held by said holder and a side surface which is at least substantially a surface of revolution about said central axis and each lacking an anomaly such as aforesaid in said side surface, each of said blanks of said one set being made substantially of plastic material and said anomaly of each of said blanks of said one set being provided by a piece of magnetic material fixed relative to said side surface of each of said blanks, and a sensor operable during the rotation of a blank as said blank is rotated about said Z axis for detecting said piece of magnetic material as it moves past said sensor during the rotation of its associated blank about said Z axis by said machine.

14. A machine for machining a blank as defined in claim 1 further characterized by said Y and Z axes being perpendicular to one another.

15. A method for generating a surface on a blank having a shape corresponding to a given eyeglass prescription, said method comprising the steps of:
(a) providing information constituting an eyeglass prescription,
(b) converting said prescription information to point data describing a surface related to said prescription in terms of y, z and $\theta$ coordinates for all points of a set of points distributed over said surface,
said y and z coordinates being linear displacements from a zero reference point measured along linear Y and Z axes intersecting one another and said $\theta$ coordinates being angular displacements about said Z axis from a reference plane containing said Z axis,
(c) providing a blank,
(d) rotating said blank continuously about said Z axis, (e) moving a cutting tool in cutting engagement with said blank continuously along said Y axis so that said tool follows a generally spiral cutting path relative to said blank, (f) repeatedly determining the instantaneous actual y and θ coordinates of said blank relative to said tool, and (g) moving said cutting tool and blank relative to one another along said Z axis in response to said instantaneous actual y and θ coordinates and with reference to said point data so that the z coordinate position of said blank relative to said tool takes on at each instant an actual value substantially equal to the commanded value thereof given by said point data for a point having in said point data y and θ coordinates substantially equal to said instantaneous actual y and θ coordinates so that said tool cuts a surface on said blank related to said prescription.

16. The method defined in claim 15 further characterized by providing as said tool a rotary cutting tool having a spherical cutting surface, and rotating said tool about an axis passing through the center of curvature of said spherical cutting surface.

17. The method defined in claim 15 further characterized by said point data being data defining a lap surface having a shape suitable for finishing a lens surface on a lens blank which lens surface has shape characteristics causing said lens blank to satisfy said prescription.

18. A method defined in claim 15 further characterized by said surface defined by said point data being a lens surface having such shape that when it is generated on a lens blank it causes said lens blank to have shape characteristics satisfying said prescription.

19. The method defined in claim 15 further characterized by said prescription including a requirement for cylinder.

20. The method defined in claim 15 further characterized by said prescription including a requirement for prism.

21. The method defined in claim 15 further characterized by said prescription including a requirement for both cylinder and prism.

22. The method defined in claim 15 further characterized by said step of continuously moving said tool along said Y axis being performed by moving said tool along said Y axis at a substantially constant rate during the major portion of its travel along said Y axis in cutting engagement with said blank, and said step of rotating said blank continuously about said θ axis being carried out by rotating said blank at a rate which is dependent on the position of said tool along said Y axis so that the tangential speed of said blank relative to said tool as said tool moves along said major portion of said Y axis remains substantially constant.

23. The method defined in claim 15 further characterized by said step of rotating said blank about said θ axis being performed by rotating said blank so as to have a tangential speed relative to said tool of at least two hundred inches per minute during the travel of said tool along said major portion of said Y axis, and said step of moving said tool along said Y axis being performed by moving said tool at such a rate that said tool moves along said Y axis at a rate of less then 0.030 inches per revolution of said blank about said 0 axis.

24. The method defined in claim 15 further characterized by said step of converting said prescription information into surface defining point data being performed by providing a computer data base storing a multitude of individually selectable blocks of data each of which blocks of data contains point data defining a surface corresponding to a specific set of prescription information, and then when given a set of prescription information selecting from said data base a block of data whose identifying presciption information closely matches said given presciption information.

25. The method defined in claim 24 wherein said point data of each of said blocks of data relate to points located in sequence along a spiral tool path.

26. The method defined in claim 15 further characterized by said step of converting said given prescription information into surface defining point data being performed by providing a data base storing a multitude of individually selectable blocks of data each of which blocks of data includes a plurality of control points located on a surface corresponding to a set of prescription information identifying said block of data, providing a computer including means for generating from a set of surface defining control points the coordinates of surface defining points located along the path of said tool relative to said blank at much smaller displacements from one another than said control points.

27. The method defined in claim 26 wherein said control points of each of said blocks of data relate to points located in sequence along a spiral tool path.

28. The method defined in claim 15 further characterized by said step of converting said prescription defining information into surface defining point data being performed by providing a computer programmed to originate the required point data in response to the input thereto of a given set of prescription information.

29. A method for machining a blank as defined in claim 15 further characterized by said Y and Z axes being perpendicular to one another.

30. A method as defined in claim 15 further characterized by said blank being a lap blank onto which said cutting tool cuts a lap surface having a shape related to said prescription information, providing a lens blank, using said prescription information to generate a gray lens surface on said lens blank which gray lens surface has a shape causing said lens blank to satisfy, except for the surface quality of said gray lens surface, said prescription information, and subsequently finishing and polishing said gray lens surface using said lap surface of said lap blank.

31. A method set forth in claim 30 further characterized by said step of generating a gray surface on said lens blank being performed by placing said lens blank in a data controlled cutting machine, and then operating said cutting machine under the control of said point data to cause said machine to cut said lens surface on said lens blank.

32. A method as defined in claim 31, further characterized by using the same data controlled cutting machine to cut both said lap surface on said lap blank and said lens surface on said lens blank.

33. A method as defined in claim 32 further characterized by said lap blank and said lens blank both being made of plastic, and using in said cutting machine for cutting both said lap blank and said lens blank a cutting tool with a spherical cutting profile.

34. A method as defined in claim 30 further characterized by said point data provided by said step of converting said prescription information to point data being such that said lap surface cut on said lap blank by said cutting tool exactly reversely matches the gray lens surface generated on said lens blank except for being compensated to allow for the thickness of a pad to be attached to said lap surface during the time said lap is used to finish and polish said lens surface.

35. A method for producing a plurality of eyeglass lenses each having a lens surface shaped to give it characteristics satisfying an associated eyeglass prescription which may vary from lens to lens, said method comprising the following steps which are performed each time a new lens is wanted:
(a) providing a lens blank,
(b) providing a lap blank,
(c) providing prescription information specifying characteristics wanted in the lens to be produced from said lens blank,
(d) using said prescription information to generated on said lap blank a lap surface accurately related in shape to the reverse of a lens surface needed on said lens blank to cause said lens blank to satisfy said prescription information, and
(e) using said lap surface to finish and polish a lens surface such as fore said on said lens blank,
said step of providing a lap blank being performed by selecting said lap blank from a set of lap blanks, and said step of providing a lens blank being performed by selecting said lens blank from a set of lens blank, the blanks making up one of said sets being distinguishable from the blanks of the other set by virtue of each of said blanks of said one set having a feature distinguishing it from the blanks of the other set, said cutting machine being operable in response to said prescription information in either a lap blank cutting mode or a lens blank cutting mode, sensing the blank placed in said cutting machine to detect the presence or absence of said distinguishing feature on said blank, and using the results of said detection to influence the operation of said cutting machine in either said lap blank cutting mode or said lens blank cutting mode.

36. A method as defined in claim 35 further characterized by said data controlled cutting machine including an operator manipulatable mode selection means for selectively setting said machine in either said lap blank cutting mode or said lens blank cutting mode, and said step of using said results of said sensing step being performed by using said results to inhibit the operation of said cutting machine in the event the cutting mode selected by said mode selection means disagrees with the type of blank sensed by said sensing means.

37. A method as defined in claim 35 further characterized by said step of providing a lap blank further including providing a lap blank having a magnetic material means attached to the lap blank to distinguish said lap blank from a lens blank.

38. A method as defined in claim 35 further characterized by said step of providing a lens blank further including providing a lens blank having a magnetic material means attached to the lens blank to distinguish said lens blank from a lap blank.

39. A method for producing a plurality of eyeglass lenses each having a lens surface shaped to give it characteristics satisfying an associated eyeglass prescription which may vary from lens to lens, said method comprising the following steps which are performed each time a new lens is wanted:
(a) providing a lens blank,
(b) providing a lap blank,
(c) providing prescription information specifying characteristics wanted in the lens to be produced from said lens blank,
(d) using said prescription information to generate on said lap blank a lap surface accurately related in shape to the reverse of a lens surface needed on said lens blank to cause said lens blank to satisfy said prescription information, and
(e) using said lap surface to finish and polish a lens surface such as foresaid on said lens blank,
said step of using said prescription information to generate a lap surface on said lap blank being performed by first using said prescription information to generate a gray lens surface on said lens blank having a shape causing said lens blank to satisfy, except for the quality of said gray lens surface, said prescription information, and then using said gray lens surface to form said lap surface on said lap blank.

40. A method as defined in claim 39 further characterized by said step of using said gray lens surface on said lens blank to form said lap surface on said lap blank being performed by attaching an abrasive pad to said gray lens surface and then using said lens blank and abrasive pad to grind said lap surface into said lap blank.

41. A method as defined in claim 39 further characterized by said step of providing a lap blank and said step of using said prescription information to generate a lap surface on said lap blank being performed by molding said lap blank in a molding process which uses said gray lens surface as a mold surface defining the shape of said lap surface on the molded lap blank.

42. A method as defined in claim 39 further characterized by said step of providing a lap blank and said step of using said prescription information to generate a lap surface on said lap blank being performed by applying a piece of sheet material to said gray lens surface, and then molding said lap blank in a molding process which uses said gray lens surface as augmented by said piece of sheet material as a mold surface defining the shape of said lap surface on the molded lap blank.

43. A method as defined in claim 42 further characterized by said step of using said lap surface to finish and polish said lens surface involving the step of attaching an abrasive pad to said lap surface, and said piece of sheet material applied to said lens surface having a thickness substantially equal to that of said abrasive pad.

44. A method as defined in claim 42 further characterized by said piece of sheet material being an abrasive pad which in said molding process becomes part of said molded lap blank and forms said lap surface.

45. A method as defined in claim 39 further characterized by said step of providing a lap blank and said step of using said prescription information to generate a lap surface on said lap blank being performed by fixing an abrasive pad to said gray lens surface, and then moving said lens blank and said lap blank relative to one another to cause said abrasive pad to grind said lap surface into said lap blank, and said step of using said lap surface to finish and polish a lens surface being performed by removing said abrasive pad from said gray surface of said lens blank, fixing an abrasive pad to said lap surface, and then lapping said gray surface of said lens blank by moving said lens blank and said lap relative to one another to cause said abrasive pad to refine said gray surface of said lens blank.

46. A method for producing a plurality of eyeglass lenses each having a lens surface shaped to give it characteristics satisfying an associated eyeglass prescription which may vary from lens to lens, said method comprising the following steps which are performed each time a new lens is wanted:
  (a) providing first and second sets of blanks, said first set of blanks being a set of lap blanks and said second set of blanks being a set of lens blanks, the blanks of one of said first and second sets each having a central axis and a side surface which is at least substantially a surface of revolution about said central axis and also each having means providing an anomaly in said side surface at one point along a line extending circumferentially of said blank about said central axis, the blanks of the other of said first and second sets of blanks each having a central axis and a side surface which is at least substantially a surface of revolution about said central axis and each lacking an anomaly such as aforesaid in said side surface,
  (b) selecting a lap blank from said first set of blanks,
  (c) selecting a lens blank from said second set of blanks,
  (d) providing prescription information specifying characteristics wanted in the lens to be produced from said selected lens blank,
  (e) placing said selected lap blank in a data controlled cutting machine which rotates said selected lap blank about its central axis,
  (f) operating said machine under the control of said prescription information to cause said machine to cut a lap surface on said selected lap blank as said machine rotates said selected lap blank about its central axis and then removing said lap blank from said machine,
  (g) placing said selected lens blank in said data controlled cutting machine for rotation about its central axis by said cutting machine,
  (h) operating said machine under the control of said prescription information to cause said machine to generate a gray lens surface on said lens blank as said machine rotates said lens blank about its central axis and which gray lens surface has a shape causing said lens blank to satisfy, except for the surface quality of said gray lens surface, said prescription information, and then removing said lens blank from said machine,
  (i) using said lap surface of said selected lap blank to finish and polish said lens surface of said selected lens blank,
  (j) during the rotation of each of said selected lap blank and said selected lens blank about its central axis by said data controlled cutting machine sensing the blank then in said cutting machine by a sensor positioned adjacent the rotational path of tis side surface to detect the presence or absence of an anomaly such as aforesaid in the side surface of said blank then in said machine, and
  (k) using the results of said sensing step to influence the operation of said cutting machine in either said lap blank cutting step or in said lens blank cutting step.

47. A method as defined in claim 46 further characterized by each of said blanks of said one set being made substantially of plastic material and said anomaly of each of said blanks of said one set being provided by a piece of magnetic material fixed relative to said side surface of each of such blanks, and said sensor being a sensor for detecting said piece of magnetic material as it moves past said sensor during the rotation of its associated blank about its central axis by said machine.

48. A machine for machining a blank to produce a surface thereon related to a given eyeglass prescription, said machine comprising:
  (a) means for converting information constituting an eyeglass prescription to point data describing a surface related to said prescription in terms of Y, Z and $\theta$ coordinates for all points of a set of points distributed over said surface, said Y and Z coordinates being linear displacements from a zero reference point measured along linear Y and Z axes intersecting one another and said $\theta$ coordinates being angular displacements from a reference plane containing said Z axis,
  (b) means for rotating a blank continuously about said Z axis,
  (c) means for moving a cutting tool in cutting engagement with said blank continuously along said Y axis so that said tool follows a generally spiral cutting path relative to said blank,
  (d) means for repeatedly determining the instantaneous actual Y and $\theta$ coordinates of said blank relative to said tool, and
  (e) means for moving said cutting tool and blank relative to one another along said Z axis in response to said instantaneous Y and $\theta$ coordinates and with reference to said point data so that the Z coordinate position of said blank relative to said tool takes on at each instant an actual value substantially equal to the commanded value thereof given by said point data for a point having in said point data Y and $\theta$ coordinates substantially equal to said instantaneous actual Y and $\theta$ coordinates.

49. A machine for machining a blank to produce a surface thereon related to a given eyeglass prescription as defined in claim 48 further characterized by said means for moving a cutting tool including a rotary cutting tool having a spherical cutting surface, and means for rotating said cutting tool about an axis passing through the center of curvature of said spherical cutting surface.

50. A machine for machining a blank and for use with either blanks supplied from a first set of blanks or with blanks supplied from a second set of blanks, said machine comprising:
  (a) a blank holder rotatable about a Z axis,
  (b) a tool for cutting a blank held by said holder as said holder is rotated about said Z axis,
  each of the blanks making up said first set of blanks having a central axis which becomes aligned with said Z axis when said blank is held by said holder and a side surface which is at last substantially a surface of revolution about said central axis and also having means providing an anomaly in said side surface at one point along a line extending circumferentially of said blank about said central axis, the blanks of said second set of blanks each having a central axis which becomes aligned with said Z axis when said blank is held by said holder and a side surface which is at least substantially a surface of revolution about said central axis and each lacking an anomaly such as aforesaid in said side surface, each of said blanks, of said first set being made substantially of plastic and said anomaly of each of said blanks of said first set being provided by a piece of magnetic material fixed relative to said side surface of each of said blanks, and (c) means including a sensor operable during the rotation of a blank as a consequence of rotation of said blank holder about said Z axis for detecting said piece of magnetic material as it moves past said sensor during the rotation of its associated blank about said Z axis by said blank holder to identify whether the blank held by said holder is one from said first set of blanks or one from said second set of blanks.

51. A method for machining a blank and for use with either blanks supplied from a first set of blanks or with blanks supplied from a second set of blanks, said method comprising:

(a) providing a first set of blanks each of which has a central axis and a side surface which is at least substantially a surface of revolution about said central axis and also having means providing an anomaly in said side surface at one point along a line extending circumferentially of said blank about said central axis, each of said blanks being made substantially of plastic material and said anomaly of each of said blanks being provided by a piece of magnetic material fixed relative to said side surface of each blank, (b) providing a second set of blanks each having a central axis and a side surface which is at least substantially a surface of revolution about said central axis and each lacking an anomaly such as aforesaid in said side surface, (c) selecting a blank from one of said sets and rotating it about its central axis, (d) providing a magnetic sensor and using it in sensing the presence of absence of an anomaly such as aforesaid as said blank is rotated about its central axis, and (e) thereafter working on said blank in one way if an anomaly such as aforesaid is detected during said sensing step and working on said blank in another way if no anomaly such as aforesaid is detected during said sensing step.

* * * * *

UNITED STATES PATENT AND TRADEMARK OFFICE
CERTIFICATE OF CORRECTION

PATENT NO. : 4,989,316　　　　　　　　　　　　　　　　　Page 1 of 3

DATED : February 5, 1991

INVENTOR(S) : Logan et al.

It is certified that error appears in the above-identified patent and that said Letters Patent is hereby corrected as shown below:

Column 3

Line 32, delete the second occurrence of "3" and substitute --2--.

Column 7

Line 44, delete "instuction" and substitute --instruction--.

Column 8

Line 28, delete "a-lens" and substitute --a lens--.
　　　Line 51, delete "perferably" and substitute --preferably--.

Column 9

Line 6, delete "perferably" and substitute --preferably--.
　　　Line 12, delete "perferably" and substitute --preferably--.
　　　Line 38, delete "another" and substitute --other--.
　　　Lines 50 and 51, delete "identifing" and substitute --identifying--.

UNITED STATES PATENT AND TRADEMARK OFFICE
CERTIFICATE OF CORRECTION

PATENT NO. : 4,989,316
DATED : February 5, 1991
INVENTOR(S) : Logan et al.

It is certified that error appears in the above-identified patent and that said Letters Patent is hereby corrected as shown below:

Column 13

Line 19, delete "contolling" and substitute-- controlling--.
Line 26, delete "..".
Line 52, delete "O" and substitute--$\theta$--.
Line 58, delete "contolled" and substitute-- controlled--.

Column 15

Line 59, delete "$\theta$" and substitute--Z--.
Line 68, delete "O" and substitute--Z--.

Column 16

Line 10, delete "presciption" and substitute-- prescription--.
Line 11, delete "presciption" and substitute-- prescription--.

Column 17

Line 19, delete "generated" and substitute-- generate--.
Line 25, delete "fore said" and substitute-- aforesaid--.

UNITED STATES PATENT AND TRADEMARK OFFICE
CERTIFICATE OF CORRECTION

PATENT NO. : 4,989,316

DATED : February 5, 1991

INVENTOR(S) : Logan et al.

It is certified that error appears in the above-identified patent and that said Letters Patent is hereby corrected as shown below:

Column 17

Line 29, delete the second occurrence of "blank" and substitute --blanks--.

Line 34, delete "said" and substitute --providing a--.

Line 34, delete "being".

Column 22

Line 14, delete the first occurrence of "of" and substitute --or--.

Signed and Sealed this

Fifth Day of May, 1992

Attest:

DOUGLAS B. COMER

*Attesting Officer*    *Acting Commissioner of Patents and Trademarks*